G. L. HUNT.
MEANS AND METHOD FOR APPLYING BRAKE LININGS TO BRAKE BANDS.
APPLICATION FILED OCT. 18, 1919.

1,411,358.

Patented Apr. 4, 1922.

Inventor.
George L. Hunt by his Atty.

UNITED STATES PATENT OFFICE.

GEORGE L. HUNT, OF BOSCOBEL, WISCONSIN.

MEANS AND METHOD FOR APPLYING BRAKE LININGS TO BRAKE BANDS.

1,411,358.

Specification of Letters Patent.

Patented Apr. 4, 1922.

Application filed October 18, 1919. Serial No. 331,703.

*To all whom it may concern:*

Be it known that I, GEORGE L. HUNT, a citizen of the United States of America, residing at Boscobel, in the county of Grant and State of Wisconsin, have invented certain new and useful Improvements in Means and Methods for Applying Brake Linings to Brake Bands, of which the following is a specification.

This invention relates to an improved method of and apparatus for applying brake-linings to brake-bands, wherein the lining is applied while the band is in a substantially completely-operative braking relation, to thereby prevent the lining drawing between the rivet fastenings. The method also facilitates the application of and proper securing of the rivet fastenings.

Brake linings have been heretofore applied by positioning the lining within the band, ordinarily punching holes in the lining in line with the holes in the band, inserting the rivets, and spreading or upsetting the rivets against an anvil. This method requires the separate application of the band and lining to the anvil in the upsetting of each rivet, and more particularly there is extreme liability of drawing the lining between rivets in its application to the free band, and the consequent uneven wear of the lining in the braking operation.

The improved method consists in clamping the free lining and band about a revoluble circular mandril corresponding in size to that of the drum for which the brake is designed, with the lining in proper position within the band. The split rivets are then simply driven through the holes in the band and through the lining being upset through contact with the mandril.

This method has many advantages over the usual method of securing the lining to the band. In the first place, through use of the method, the lining is initially properly positioned with relation to the band and is smoothly and evenly applied. Furthermore by merely revolving the mandril, the rivets may be readily and properly inserted without handling the band and lining, and without any possibility of disturbing the relation of the lining and band, and hence drawing of the lining between rivets is impossible; and, again, the rivets upset against a surface having the curvature of the drum for which the brake is designed are so upset as to conform to the drum surface, and the projection of any portion of the rivets is avoided.

The method is carried out by an apparatus illustrated in the accompanying drawings in which:—

Figure 1:
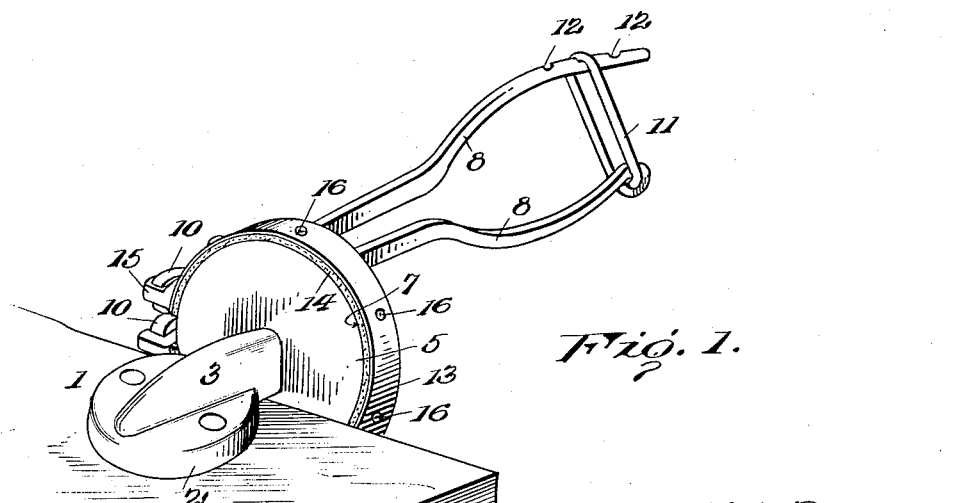
Fig. 1 is a perspective of the apparatus, the band and lining being shown in position thereon.
Figure 2:
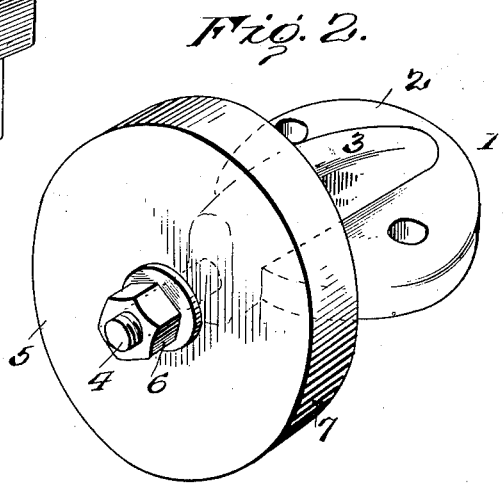
Fig. 2 is a perspective view of the anvil.
Figure 3:
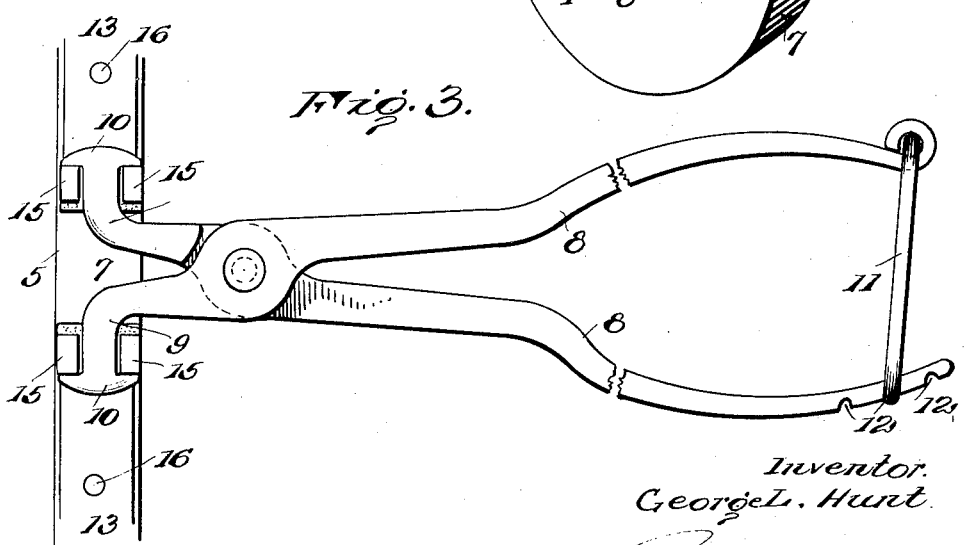
Fig. 3 is a plan of the band locking means.

The apparatus comprises a support 1, including a base 2, adapted to be secured to a bench or the like, and an arm 3 projecting from the base, and terminating in a stub-shaft 4. An anvil 5 is rotatably supported on the shaft 4, a nut 6 confining the anvil and providing for the convenient mountings of anvils of different sizes.

A locking means is provided for clamping the band and lining on the bearing surface 7 of the anvil, such means being here shown as pivoted levers 8, having their inner ends 9 extended laterally and oppositely and formed with holding lugs 10.

The handle ends of the levers are held in position to secure the locking action later described by a loop-link 11, carried by one handle, engaging over the other handle, notches 12 in the latter preventing displacement of the loop.

In carrying out the method, an anvil of substantially the same size as the drum with which the brake is to cooperate, is positioned on the shaft 4. The brake-band 13 with the lining 14 arranged within the same, is then applied to and about the surface 7 of the anvil, and locked in position. The locking operation consists in engaging the terminal portions of the arms 9 of the locking means between the ears 15 found on the brake band with the lugs 10 of the locking means beyond such ears. The handles of the locking means are then drawn upon to tightly clamp the band and lining about the anvil, and the handles secured in such position by the loop link 11. This tightening operation not only firmly secures the brake and lining in fixed relation, but smooths the lining and shapes it into correspondence with that of the anvil, and hence with that of the brake-drum with which it is to cooperate.

The lining is then secured to the band by simply driving split rivets 16 through the holes already in the band, through the lining, this driving upsetting the rivets, or spreading their ends, against the surface of the anvil. In applying the rivets it is only necessary that the anvil be turned to conveniently position the successive rivet holes in the band, as the relation of the band, lining and anvil are fixed and will not be disturbed. In the turning of the anvil the locking means may serve as a convenient handle, though this is of little importance.

Following the application of the rivets, the locking means is released, and the lining will be found evenly and smoothly applied and shaped, and the upset ends of the rivets correspondingly shaped, so that a full, even and uniform braking contact of the lining will be had on the brake-drum in use.

I claim—

1. The herein-described method of securing brake-linings in brake-bands, consisting in clamping the lining and band in proper relative positions about a circular anvil corresponding in size to that of the brake-drum for which the brake is designed, and driving rivets through the holes in the band and through the lining to cause them to upset against the surface of the anvil.

2. A brake-lining holding means comprising a rotatable circular anvil, and means for engaging the ends of the brake-band to secure the band and underlying lining firmly against and in conformity with the shape of the anvil.

3. A device of the class described comprising a circular anvil receivable within a transmission or like band, and means for engagement with the ends of the band for contracting such band around said anvil.

In testimony whereof I affix my signature.

GEORBE L. HUNT.